United States Patent Office 2,756,544
Patented July 31, 1956

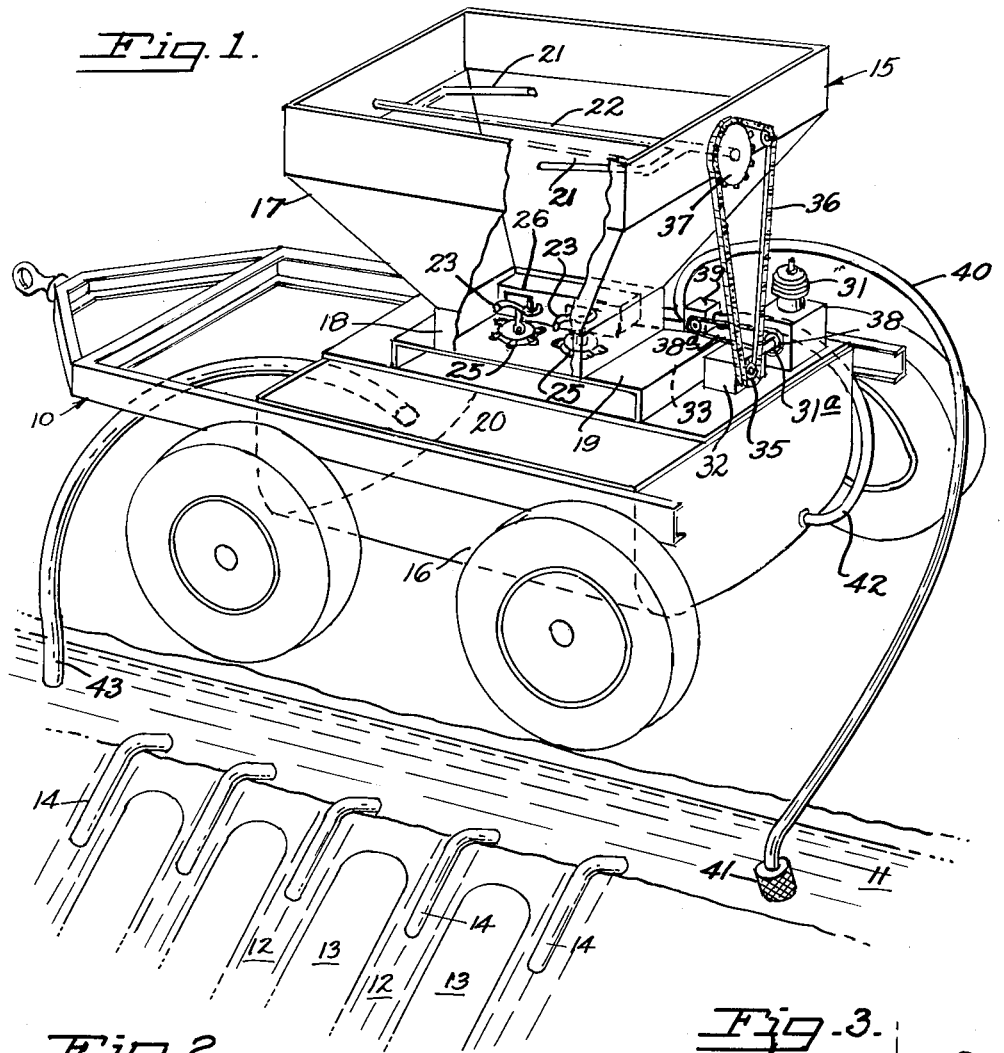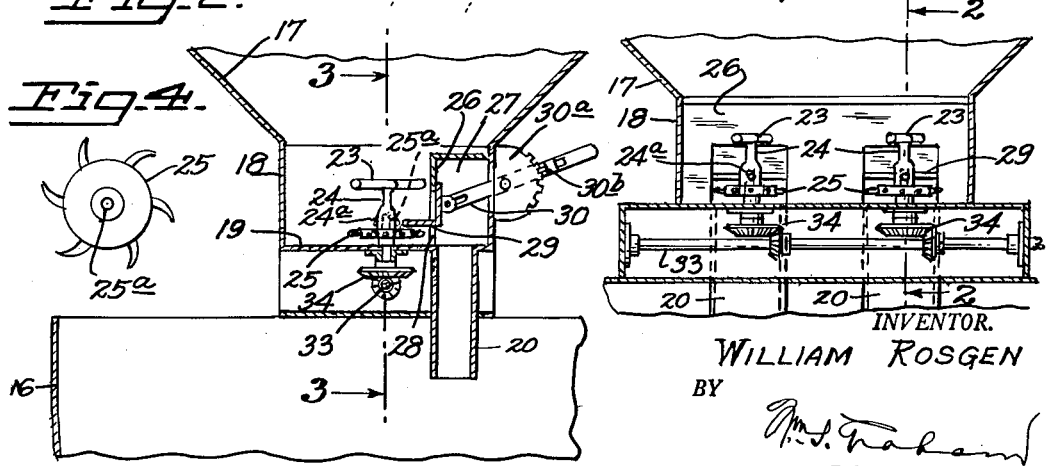
INVENTOR.
WILLIAM ROSGEN

2,756,544

METHOD AND APPARATUS FOR DISPENSING FERTILIZERS TO IRRIGATION WATER

William Rosgen, Sunnyvale, Calif., assignor to D'Arrigo Bros. Co. of California, San Jose, Calif., a corporation of California Application September 25, 1953, Serial No. 382,437

10 Claims. (Cl. 47—58)

This invention relates to method and apparatus for hydraulically dispensing fertilizers and the like, used in connection with irrigation systems in agricultural projects. More particularly the invention relates to method and apparatus for lifting water from a source of supply such as an irrigation ditch, passing it into a container and there emulsifying it with fertilizer, preferably of a water soluble type, and flowing the emulsified water and fertilizer upon the ground to be fertilized or returning it to the irrigation ditch where it is added to other water and spread upon the fields as a water-emulsified liquid. The term fertilizer is used in a broad sense to include other materials which may be deposited upon fields in emulsified liquid form, such as gypsum, insecticides, soil conditioners, and the like.

It is well known that in large areas of the country and particularly in the western portion, the rainfall during the growing season for crops is very limited, and that it is a common practice to irrigate the fields and crops by artificial irrigation which may be either by flooding the fields broadly for certain crops such as alfalfa hay, or may be ditch irrigation for row crops like beans, tomatoes and other vegetables. In such irrigation main irrigation ditches bring water by flow from a canal and into a main ditch along the more elevated edge of a field. For row crops, smaller ditches or trenches, sometimes referred to as laterals, are run from the main or larger ditch towards the lower end of the field, usually in parallel rows spaced apart the necessary distance for upraised land rows therebetween, the water being flowed to these laterals from the main ditch and thereby flowing downhill between the crop rows. Heretofore two methods of such irrigation have been customary, one of which is to spread fertilizer over fields in various ways in pulverized form from a spreader apparatus, which must normally be done prior to planting, since after the crop is planted and the plants are growing such spreading cannot be easily performed. A second customary method has been to deposit the fertilizer in dry pulverized form in the irrigation ditches and permit the flowing water to carry it upon the land, which results in irregular and uneven application of the fertiziler. The present invention contemplates utilizing the flow of water in these irrigation ditches and laterals, for spreading the fertilizer evenly throughout the field in liquid emulsified form and thus increase the penetration of the fertilizer into the ground, spread it more evenly, regulate the quantity per acre, increase its efficiency, facilitate application while a crop is growing, reduce the labor of application and decrease the expense thereof, as well as other advantages.

Briefly described, the invention consists of mounting on a traction vehicle of apparatus comprising a pulverizing hopper for receiving and maintaining separate from the water a supply of fertilizer, soil conditioner or the like, the hopper having regulated feed means into an underlying emulsifying tank into which is pumped under pressure water from an intake conduit having a free end for placing in the flow of water in an irrigation ditch, and the opposite end of the conduit being connected with one end of the emulsifying tank, a pump being interposed in the conduit; the other end of the emulsifying tank having an outlet conduit preferably of larger diameter for conveying emulsified fertilizer and water back to the irrigation ditch, whereupon it is added to other water flowing in the ditch and flowed upon the land. The term emulsifying is used in a broad sense of impregnating the water with fertilizer, whether the resultant liquid be a solution or suspension of the fertilizer.

One form in which the invention may be embodied is described and claimed herein and illustrated in the accompanying drawing, to which reference is made for a more detailed description of the invention.

In the drawing:

Fig. 1 is a perspective view of the invention mounted on a traction vehicle.

Fig. 2 is a fragmentary vertical transverse section on line 2—2 of Fig. 3.

Fig. 3 is a fragmentary longitudinal section on line 3—3 of Fig. 2, and Fig. 4 is an enlarged plan view of starwheel.

Referring to the drawing in which like reference characters indicate the corresponding parts in the several views, 10 is any suitably propelled traction or trailer vehicle upon which the apparatus is mounted for moving along a main irrigation ditch 11 in which water is flowed along the more highly elevated side of a field. Laterals 12 extend from the main ditch toward the lower elevation of the field and are separated by mounds or land rows 13 upon which the crop grows, water from the main ditch usually being lifted from the main ditch over its retaining bank and into the laterals by the simple device of crooked tubes 14 in which a suction flow is induced by an initial vacuum in a well-known manner, the use of the tubes 14 serving to spread the water evenly into the laterals.

Upon the chassis of vehicle 10 is mounted emulsifying apparatus generally indicated 15 comprising an emulsifying tank 16 having enclosing walls preferably elongated relatively wide compared with its depth and having an arcuate bottom. Preferably the tank also has a top closure plate as a mounting base for apparatus to be described. Upon the top plate of the tank is mounted a pulverizing and mixing open-top hopper 17 of any suitable shape preferably having inwardly converging walls from a larger open top to a smaller bottom or throat 18, the throat portion being closed by an upraised platform 19 upon which the hopper is mounted, thus maintaining the contents of the hopper out of contact with the water which flows into the emulsifying tank. The platform 19 has one or more tubular feed chutes 20 therethrough depending from the platform and extending sufficiently into the tank so that the open free end of the chutes will be clear of any normal volume of water in the tank. The feed chutes are preferably offset from the center of throat 18 as best shown in Fig. 2.

The hopper is for receiving a supply of the material to be emulsified with the water in tank 16. Some types of materials which may be emulsified may be liquid, or may be readily siftable and flowable granules which will sift readily into the tank, while other material may be in lumpy yet friable condition requiring agitation to provide a pulverized form to facilitate its feed and emulsification in the water, in which it is preferably miscible or soluble. Wherefore there is provided in the hopper agitator means for crumbling and pulverizing the material and maintaining it in such friable pulverized form until it is fed through the chutes 20 into the water tank, the hopper also including means for adjustably regulating the amount of such deposited material which is fed into the tank.

As illustrated, the primary agitator means comprises a pair of arms 21 mounted in the hopper 17 for revolving in spaced relation at substantially opposite sides of the axis of a rotatable shaft 22 supported in the side walls of the hopper adjacent the open top, the initial agitation being principally to break up lumps of the said materials which are fed into the hopper at the open top.

Since certain materials such as gypsum may become compacted at the throat, suitable secondary agitating or pulverizing means is provided in the throat in spaced relation to the platform 19, and may comprise one or more horizontal S-shaped blades 23 mounted at their central portion on vertical rotatable stub shafts 24 which have a slotted slip-joint connection 24a for unison rotation with vertical driven shafts 25a. The vertical driven shafts 25a also mount for rotation therewith star-wheels 25, the latter closely overlying the platform 19 and having peripheral teeth or spurs which, upon rotation of the star wheels, propel the pulverized fertilizer into the chutes 20.

Suitable means are provided for regulating the quantity of fertilizer material fed from the hopper to the tank by the star wheels and chutes 20, and as illustrated, comprises an overhanging canopy plate 26 providing a compartment 27 in the hopper throat overlying and communicating with the upper open ends of chutes 20, the canopy plate having an opening 28 in its wall through which the teeth of the star wheels extend sufficiently to propel fertilizer into the chutes. The opening 28 is controlled by raising and lowering a gate 29 on pivoted lever 30 the position of which is regulated by rack 30a and pawl 30b, at the exterior of the throat wall.

Driving means are provided for rotating the initial agitators 21, the secondary agitators 23 and the star wheels 25, such means being exemplified by a motor 31 transported with the apparatus and preferably mounted on the tank 16, for rotating a shaft 31a which, by suitable gears in gearbox 32, drives a shaft 33 which, at its opposite end portion drives intermeshing gears 34 which rotate the vertical shafts 25a and thereby rotate the secondary agitators 23 and the star wheels 25. The shaft 33 also drives a sprocket 35 which, by suitable belt or chain 36, rotates a sprocket 37 upon the shaft 22 upon which the agitators 21 are mounted.

The driven shaft 31a also mounts for rotation a sprocket 38 which, through suitable belt or chain 38a, also drives a centrifugal water pump 39 which has a suction side and a pressure side, the pump being connected at its suction side in communication with a suction or lifting conduit 40, the free end of which is immersible in the flowing water of a main irrigation ditch, said free end being provided with a suitable strainer 41 to prevent foreign detritus from entering the conduit. The opposite or pressure side of the pump connects to a pressure conduit 42 which empties into one end of the tank 16 preferably closely adjacent the bottom thereof. An outlet conduit 43 for discharging the emulsified fertilizer and water from the tank is connected to the opposite end wall of the tank 16, also preferably adjacent the bottom of the tank but further removed from said bottom than the pressure conduit 42, the outlet conduit being of greater diameter than the pressure conduit 42.

The operation of the apparatus may be briefly described. Being mounted upon a transport vehicle it may be moved from field to field and along any suitable irrigation ditch. The fertilizer, gypsum or other material to be emulsified is placed in the hopper 17, and, where necessary, is pulverized initially by agitators 21 and secondary agitators 23, the amount thereof to be fed into the water tank 16, being regulated by the gates 29, lever 30 and rack 30a, whereupon it is propelled by the teeth of the star wheels 25 into the chutes 20 and thence into tank 16. The tank is supplied with water taken from the irrigation ditch by the suction conduit 40, discharged under pump pressure by conduit 42 into one end of the tank closely adjacent the bottom where the pressure agitates the water to emulsify the deposited fertilizer material, whereupon the emulsified fertilizer and water is redeposited in the main irrigation ditch through the outlet conduit 43 at the opposite end of the tank. The pressure agitation of the fertilizer and water in the tank quickly emulsifies the fertilizer in a liquid vehicle. The relatively long body of water between said inlet and outlet, and the outlet conduit being of greater diameter than the inlet or pressure conduit and having communication with the tank at a higher level, causes the agitating pressure from the inlet conduit to be absorbed in the body of water in the tank, and the outflow through the conduit 43 to be constant, and devoid of sufficient velocity to erode and injure the retaining banks of the irrigation ditch and also spreads the emulsified liquid more evenly in the ditch and permits it to spread evenly in the flow of the main ditch to be picked up by the suction tubes 14 for equalized distribution to the laterals.

Such apparatus has the advantages of enabling the farmer to distribute fertilizers or gypsum accurately in his irrigation ditches wherein the pressure agitation assures complete dissolution of fertilizer in the liquid, the distribution of the fertilizer is so even and uniform throughout the field that it saves the wasting of fertilizer material, the operation does not require the operator to be constantly at the machine, thereby allowing irrigation operators time to check the irrigation through the field, and the device is simple in mechanical structure effecting economy of operation and repair since it is largely composed of standard commercially obtainable mechanical parts.

Having thus described the invention, what is claimed as new and patentable is:

1. A method of hydraulically spreading fertilizers and the like to fields having an irrigation ditch, comprising the steps of taking from the irrigation ditch a supply of water in a continuous flow and accumulating an enclosed body thereof, maintaining a supply body of fertilizer out of contact with the body of water, feeding fertilizer in adjustably varying amounts from said supply into said enclosed body of water, emulsifying the enclosed water and fertilizer by flowing ditch water thereinto at a given velocity under force of applied pressure while simultaneously discharging the emulsified liquid at a relatively lesser velocity from the enclosed body thereof into the water in the irrigation ditch, and flowing the emulsified liquid from the ditch upon fields to be irrigated.

2. A method of hydraulically spreading fertilizers to fields having an irrigation ditch system, comprising the steps of claim 1 and including emulsifying the enclosed body of water and fertilizer by the pressure flow of ditch water directly thereinto in a continuous stream and simultaneously discharging the emulsified water and fertilizer in a continuous stream.

3. A method of the character described having the elements of claim 1 and including the step of flowing the additional water into the enclosed supply and discharging emulsified fertilizer and water from said enclosed supply at a higher level than the inflow of the added water from the ditch.

4. A method of hydraulically spreading fertilizers and the like to fields having an irrigation ditch system, comprising the steps of taking from an irrigation ditch system a supply of water in a continuous flow and accumulating an enclosed body thereof, impregnating said enclosed water with fertilizer or the like, emulsifying the enclosed water and fertilizer by a flow of additional ditch water thereinto under applied pressure at one velocity of flow, while simultaneously discharging the so emulsified liquid directly from the emulsified body thereof into the irrigation ditch system at a relatively lesser velocity of flow, and flowing such emulsified liquid upon the fields to be irrigated.

5. Fertilizing apparatus of the character described, including a transport vehicle, vehicle having mounted thereon an enclosed tank for holding an enclosed supply of water mounted upon the vehicle, hopper means for holding and agitating a supply of fertilizer out of contact with the enclosed water, means for feeding fertilizer into said tank, means for adjustably regulating said feed of fertilizer from the hopper into the tank, a pump carried by the vehicle and having a suction conduit for taking water from an irrigation ditch and a pressure conduit for injecting water into the tank, and a discharge conduit from said tank and having a free end for returning emulsified liquid from the tank to an irrigation ditch.

6. Apparatus for hydraulically spreading fertilizer and the like to fields having an irrigation ditch system, including the elements of claim 5, and in which the hopper overlies the tank and has rotatable agitators therein, and in which the discharge conduit from the tank is of greater diameter than the inlet conduit.

7. Fertilizing apparatus of the character described having the elements of claim 5 and in which the means for feeding fertilizer into said water tank includes a hopper which overlies the tank and has rotatable agitators therein, and the means for feeding the fertilizer includes a chute communicating with the hopper, and the means for adjustably regulating the feed of fertilizer is operatively between the hopper and the upper end of the chute, the opposite end of the chute extending into the water tank.

8. Apparatus for hydraulically spreading fertilizer and the like to fields having an irrigation ditch system, including the elements of claim 5, and in which the conduits conected to the water tank communicate with opposite portions of said water tank, the pump in the inlet conduit having sufficient pumping pressure capacity to make a pressure flow into the tank of greater velocity than the velocity of flow through the outlet discharge conduit.

9. Apparatus for hydraulically spreading fertilizer and the like to fields having an irrigation ditch system, comprising a suitably transportable enclosed tank for holding an enclosed supply of water, said tank having respective inlet and outlet openings, the outlet opening being more elevated from the bottom of the tank than the inlet opening whereby a volume of water may be held in the tank above the level of the inlet opening, a hopper for holding a supply of fertilizer out of contact with said enclosed water supply, said hopper and said tank having a communicating opening therebetween, means for feeding said fertilizer from the hopper into said tank, means interposed in said communicating opening between the hopper and said tank for adjustably controlling said feed of the fertilizer, a pump mounted for transport with the tank and having a suction inlet and a pressure outlet, a first conduit connected to said suction inlet and the opposite end of which is free for immersing in water of an irrigation ditch, a second conduit communicating between said pressure outlet of the pump and the inlet of the water tank, and a discharge conduit having one end connected to communicate with the outlet opening of said tank and having its opposite ends free for returning water from the tank to an irrigation ditch.

10. Fertilizer apparatus of the character described having the elements of claim 9 and in which the tank has a top closure and the pump and the means for feeding fertilizer into said tank are mounted on the top closure, said feed means including agitators in the hopper and a chute underlying the hopper, the means for controlling the amount of fertilizer fed into the chute being operatively between the hopper and one end of the chute, the opposite end of the chute extending into said water tank.

References Cited in the file of this patent

UNITED STATES PATENTS

| | | |
|---|---|---|
| 1,862,238 | Roe | June 7, 1932 |
| 1,862,239 | Roe | June 7, 1932 |
| 1,864,947 | Selfridge | June 28, 1932 |
| 2,478,079 | Beasley | Aug. 2, 1949 |